United States Patent [19]

Peterson et al.

[11] Patent Number: 5,588,067
[45] Date of Patent: Dec. 24, 1996

[54] MOTION DETECTION AND IMAGE ACQUISITION APPARATUS AND METHOD OF DETECTING THE MOTION OF AND ACQUIRING AN IMAGE OF AN OBJECT

[76] Inventors: Fred M. Peterson, 401 Varsity Estates Bay N.W., Calgary, Canada, T3B 2W7; James A. Yee, 76 Silver Springs Drive, N.W., Calgary, Canada, T3B 3G4

[21] Appl. No.: 19,847

[22] Filed: Feb. 19, 1993

[51] Int. Cl.⁶ .............................. G06K 9/00; G06K 9/64; H04N 7/18
[52] U.S. Cl. .................... 382/103; 382/107; 382/278; 348/154; 348/700
[58] Field of Search ................ 382/41, 42, 278, 382/197, 280, 103, 107; 348/352, 431, 154, 97, 47, 129, 134, 139, 142, 350, 700, 701

[56] References Cited

U.S. PATENT DOCUMENTS

| | | |
|---|---|---|
| 2,839,149 | 6/1958 | Piety . |
| 3,510,223 | 5/1970 | Lohmann ............................ 356/71 |
| 4,011,446 | 3/1977 | Swanberg ........................... 250/201 |
| 4,216,536 | 8/1980 | More ................................... 367/83 |
| 4,449,193 | 5/1984 | Tournois ............................. 364/604 |
| 4,516,206 | 5/1985 | McEvilly ............................ 364/421 |
| 4,637,056 | 1/1987 | Sherman et al. ..................... 382/31 |
| 4,669,054 | 5/1987 | Schlunt et al. ..................... 364/822 |
| 4,678,920 | 7/1987 | Iadipaolo et al. .................. 250/560 |
| 4,695,973 | 9/1987 | Yu ....................................... 364/822 |
| 4,745,562 | 5/1988 | Prazdny et al. .................... 364/551 |
| 4,837,843 | 6/1989 | Owechko et al. .................. 382/31 |
| 4,843,631 | 6/1989 | Steinpichler et al. ............. 382/17 |
| 4,845,682 | 7/1989 | Boozer et al. ..................... 367/93 |
| 4,890,160 | 12/1989 | Thomas ............................... 358/105 |
| 4,948,212 | 8/1990 | Cheng et al. ...................... 350/3.64 |
| 4,998,286 | 3/1991 | Tsujiuchi et al. .................. 382/42 |
| 5,016,976 | 5/1991 | Horner et al. ..................... 350/162.13 |
| 5,020,113 | 5/1991 | Lo et al. ............................ 382/42 |
| 5,043,705 | 8/1991 | Rooz et al. ........................ 340/573 |
| 5,046,179 | 9/1991 | Uomori et al. .................... 364/728.03 |
| 5,063,524 | 11/1991 | Ferre et al. ....................... 382/28 |
| 5,070,403 | 12/1991 | Wilkinson ........................... 358/136 |
| 5,073,006 | 12/1991 | Horner et al. ..................... 359/561 |
| 5,105,356 | 4/1992 | Maute et al. ...................... 364/422 |

*Primary Examiner*—Jose L. Couso
*Assistant Examiner*—Matthew C. Bella
*Attorney, Agent, or Firm*—Anthony R. Lambert

[57] ABSTRACT

An image acquisition device for microfiche images which uses solid state sensor and supporting electronics to continuously digitize the image at high frame rates, and uses the correlation function of the current frame with respect to the previously saved reference frame to derive the image motion vector, keeping only frames whose image motion vector indicates motion of more than 1 unit of resolution, and reconstruct the acquired image as a mosaic of the save image frames and its associated motion vector.

35 Claims, 7 Drawing Sheets

MOTION DETECTION AND IMAGE ACQUISITION APPARATUS AND METHOD OF DETECTING THE MOTION OF AND ACQUIRING AN IMAGE OF AN OBJECT

FIELD OF THE INVENTION

This invention relates to apparatus and method for detecting motion of an object and for capturing a digital representation of an object. The apparatus and method are particularly to suited to the capturing of an image on microfiche or microfilm, such as oil or gas well logging data.

CLAIM TO COPYRIGHT

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

CROSS-REFERENCE TO DOCUMENT FILED UNDER THE DOCUMENT DISCLOSURE PROGRAM

The inventors claim benefits under the document disclosure program in view of a disclosure filed Jun. 19, 1992, as document no. 311,128.

BACKGROUND AND SUMMARY OF THE INVENTION

Most oil and gas well logs are available only on microfiche or microfilm in analog form and are not readily available in digital form. While there has been some capturing of well logs in digital form during about the past 15 years, most well logs are still not digitized. The benefit of digitized well logs is that they are easily processed using commonly available general purpose computers already in use in the industry.

There are currently under development devices that are intended to rasterize images of complete microfiche and store them on optical disc for subsequent access. However, it is not believed that this approach will meet the needs of the oil and gas servicing industry for a convenient, low cost, interactive interface between a general purpose computer and the data residing in microfiche well log libraries.

In general, image acquisition devices can be classified into two categories, depending on whether the size of the image to be captured can be projected at the required resolution onto the active sensor area or not. This invention is concerned with the category where the size of the image at the required resolution is larger then the active area of the sensor. This requires a means of controlled movement of the image pass the field of view of the sensor. One method of doing this is to move the image to be acquired with a precision transport device 1 pixel at a time into the field of view of the sensor. The acquired image is the mosaic of successive image separated by the known spatial separation determined by the movement of the transport device. Another method of doing this is to move the image to be acquired or a reflected image from a mirror system at a constant speed past the field of view of the sensor. The acquired image is a mosaic of successive images separated by a spatial separation derived from the image acquisition rate and the velocity at which the image is moved pass the field of view of the sensor.

Both of the above techniques require a mechanical coupling of the image to be acquired to the image acquisition device. The quality and ultimate resolution of the image will be determined by the tolerance of this mechanical coupling, the distance moved or the ability to maintain a constant velocity. Since microfiche is moved by hand in the XY plane, it will be appreciated that precision of the mechanical coupling is quite difficult to achieve.

The inventors have proposed a new method and apparatus for capturing a digital representation ("image") of data contained in the XY plane such as a microfiche well log that does not rely on mechanical coupling of the microfiche log to the image acquisition device.

In the operation of the present invention, sensors, preferably solid state sensors, are used to capture (acquire and store) in digital form a series of optical images of the two dimensional data. Information in the series of optical images themselves is used to detect the motion of the images. To do this, a subject (current) digitized image is compared with a saved (reference) digitized reference image. The correlation function of the subject image with respect to the reference image is used to calculate the motion of the image in order to determine whether any particular captured image is to be stored in a permanent fashion and to assign location parameters to it.

In one aspect of the invention, therefore, the apparatus, which would be attached to a microfiche reader, would sense and measure image motion and provide a rasterized image to a general purpose computer for subsequent processing.

This invention does not require the image to be moved by some precise mechanical means past the field of view of the sensor. Without the need for any mechanical coupling, the ultimate resolution that can be achieved is only limited by the optics of the device. The technique used for image acquisition is applicable for arbitrary image motion (subject to a maximum velocity) in two dimensions.

In the case where the microfiche record or object being digitized lacks optical features that are resolvable by the sensors, that is, where the image is sparse, it is necessary to use some means to ensure that the image is non-sparse. This may be achieved, for example, by superimposing a grid on the microfiche or attaching some other non-sparse device to the microfiche carrier. This non-sparse device may then be imaged by an area sensor to carry out motion detection in accordance with the principles of the invention. At the same time, the microfiche record is imaged preferably using some other sensor such as a linear sensor and the record may be reconstructed using the image acquired using the linear sensor and an indication of the degree of motion of the non-sparse device.

BRIEF DESCRIPTION OF THE DRAWINGS

There will now be described a preferred embodiment of the invention, with reference to the drawings, by way of illustration, in which like numerals denote like elements and in which.

Attached hereto as schedule A is a paper copy of the program required to implement the algorithms used in the operation of the present invention.

DETAILED DESCRIPTION OF PREFERRED EMBODIMENTS

Firstly there will be described the concept of image motion as used in the operation of the present invention, and then the mathematical relationship between a pair of images is described to show how motion between the images may be calculated. Next the components used in the operation of the invention are described. The word "image" as used in this disclosure includes an optical representation or an analog or digital electronic representation of an object. The word "object" includes a microfiche or microfilm record together with a device or means, if necessary, for ensuring that the microfiche or microfilm record includes a non-sparse portion, such means including a reference grid superimposed on the record.

Figure 1A:
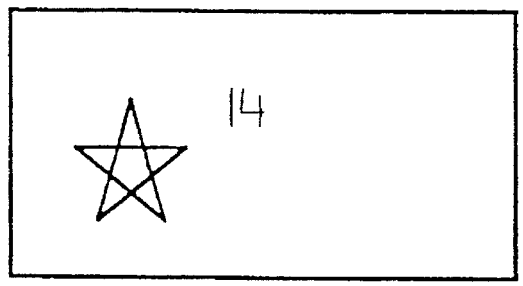
FIG. 1a, 1b and 1c are schematics illustrating the concept of an image motion vector.
Figure 1B:
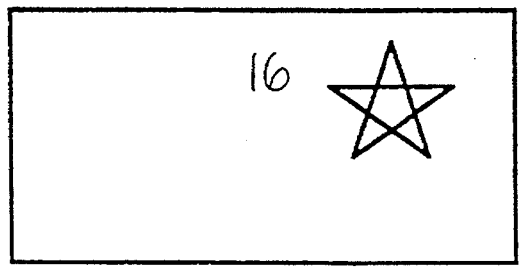
Figure 1C:
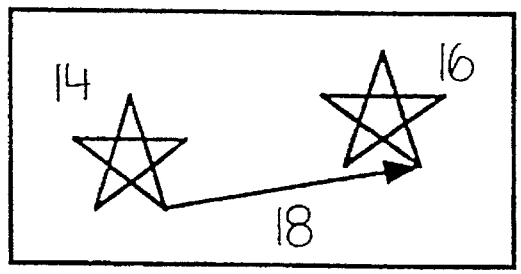

The concept of an image motion vector as used in the present invention is illustrated in FIGS. 1a, 1b and 1c. FIG. 1a shows a reference image 14, which is an image which has been acquired using a sensor or scanner and stored. The size of the frame corresponds to the field of view of the sensor. FIG. 1b shows the same image (current or subject image) after motion has occurred (16) and this image too has been acquired with a sensor and stored electronically. The current image is displaced with respect to the reference image. FIG. 1c shows the vector 18 that is a representation of the displacement. This is called the image motion vector. During scanning of the object with the sensor, a series of successive images are acquired, the images 14 and 16 being representative such images. As successive images are acquired, each subject image except the last will in turn become a reference image.

An image of the object will be stored permanently only when movement between successive images has occurred. Movement corresponds to the image motion vector being close (within predefined limits) to some preselected threshold, preferable one unit of resolution. The phase spectrum of the Fourier Transform of the correlation function of the subject image with the reference image is preferably used to calculate the image motion vector. The correlation function of the subject image with the reference image itself may also, but less preferably, be used to calculate the image motion vector. The image motion vector is preferably calculated in the operational part of a general purpose computer programmed to carry out the function (as with the software attached hereto). The two dimensional correlation function is given by:

$$\phi(\tau_x, \tau_y) = \sum_{i=0}^{N-1} \sum_{j=0}^{M-1} X(i,j) * Y(i+\tau_x, j+\tau_y) \quad \text{Equation 1}$$

where: N=number of horizontal image pixels,
M=number of vertical image pixels,
$\tau_x$=horizontal lag,
$\tau_y$=vertical lag,
$\phi(\tau_x, \tau_y)$ is the correlation matrix,
X(i, j) is the reference image,
and $Y(i+\tau_x, j+\tau_y)$ is the subject image.

The image at any particular time is just a translational displacement of the reference image. Equation (1) above is thus an autocorrelation function. The digitized image corresponds to a spatial sampling of the optical image. The sampling period is the centre-to-centre distance between the pixels in the solid state sensor. The correlation matrix $\phi(\tau_x, \tau_y)$ will have a maximum value at some location or point $\phi_{max}(\tau_x, \tau_y)$.

The image motion vector is preferably calculated as follows:

1. Calculate the Discrete Fourier Transform G(f,k) of the correlation matrix $\phi(\tau_x, \tau_y)$.

2. Separate the Discrete Fourier Transform G(f,k) into an amplitude spectrum A(f,k) and a phase spectrum Θ(f,k).

A(f,k)=G(f,k) G*(f,k)

$$\Theta(f, k) = \text{Tan}^{-1}\left[\frac{Im\{G(f, k)\}}{Re\{G(f, k)\}}\right] \quad \text{Equation 2}$$

where superscript * denote complex conjugate.
Im {G(f,k)} is the imaginary part of G(f,k).
Re {G(f,k)} is the real part of G(f,k).

3. The phase spectrum in this case, where the current image is just a translational displacement of the reference image, defines a PLANE in the frequency space (f,k). The projection of this Θ(f,k) plane onto the f axis defines a straight line given by Θ(f,0)=2πf(δx)  Equation 3 where δx is the translational displacement of the current image from the reference image in the x direction.
Similarly, the projection of the Θ(f,k) plane onto the k axis defines a straight line given by Θ(0,k)=2πk(δy)  Equation 4 where δy is the translation displacement of the current image from the reference image in the y direction.
Therefore, the motion vector (δx,δy) can be calculated by:

δx=slope{Θ(f,0)}/(2π)  Equation 5

δy=slope{Θ(0,k)}/(2π)  Equation 6

The motion vector (δx,δy) defines the translation displacement of the current image from the reference image. If the translational displacement is insufficient, that is less than some preselected threshold, then it may be assumed that no movement has occurred for the purpose of storing permanently the image of the object.

Alternatively, if the correlation matrix is used to calculate the motion vector, the image motion vector is the offset of the maximum correlation value from the zero lag ($\tau_x$=0, $\tau_y$=0) position. If the movement is insufficient, that is, the offset is less than some preselected threshold, then it may be assumed that no movement has occurred.

In addition, a sensor with a large linear field of view continuously captures a linear image simultaneously (synchronously) with the two dimension sensor. When the motion vector indicates the image has moved a defined threshold, preferably 1 unit of resolution, the linear image is saved and tagged with its associated motion vector, which is represented by a signal that is generated and stored. The acquired image is reconstructed as a mosaic of the saved linear images, the relative position of which is given by the associated motion vector.

This technique requires that the image be non sparse, which may or may not be the case in practice, depending on the particular image being sensed. The non-sparse nature of the image can be ensured by superimposing a reference grid onto the image. The technique of imposing a grid onto the image without changing the image visually is disclosed in the preferred implementation below for the case of a microfiche record. Other methods could be used in accordance with the teachings of the present invention.

Figure 2:
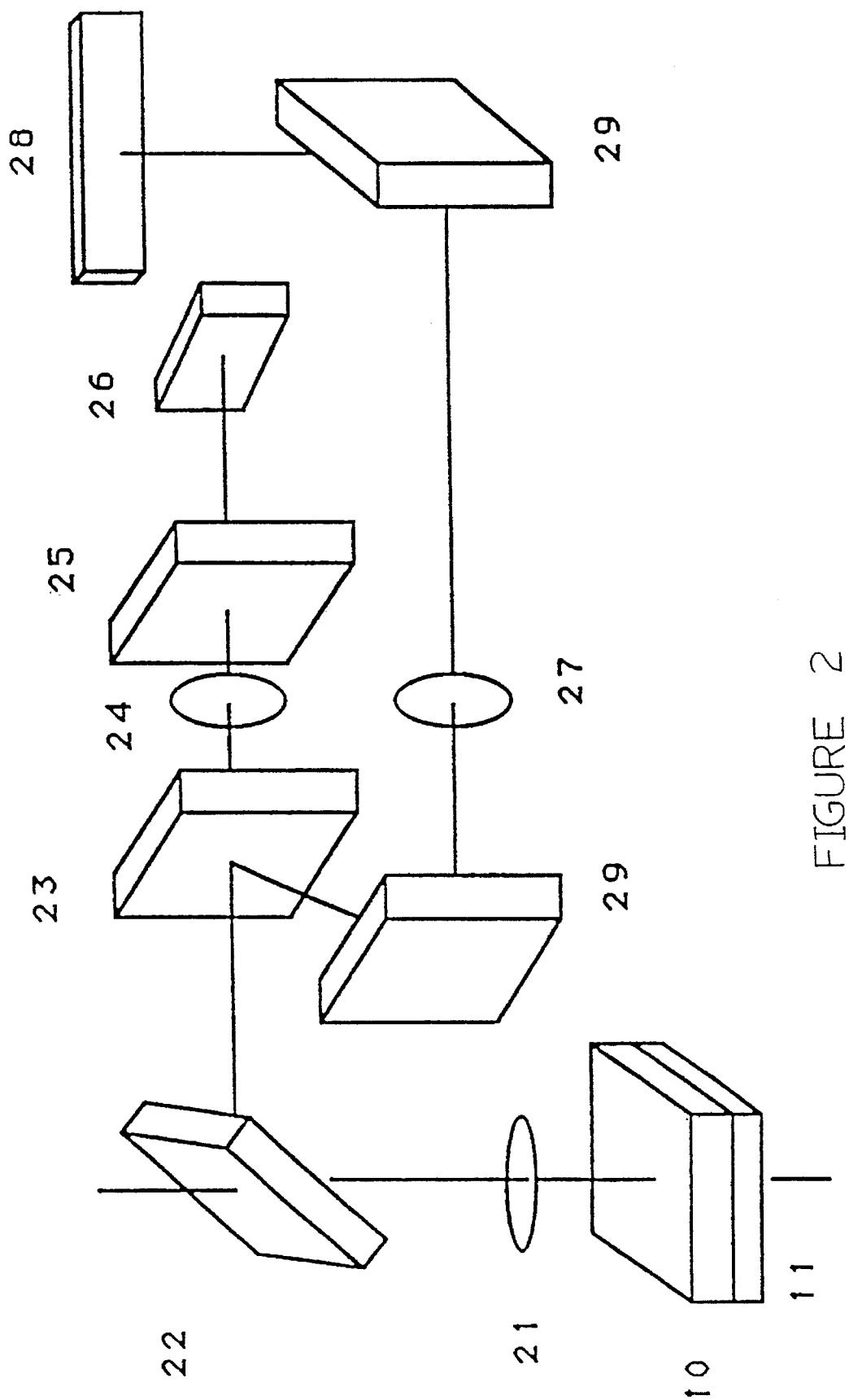
FIG. 2 is a is a schematic showing the opto-electronic components of one embodiment of the present invention.

Referring to FIG. 2, the exemplary apparatus of the invention uses the components of a conventional microfiche reader as illustrated by microfiche carrier tray 11 and microfiche reader lens 21 disposed above the carrier tray to receive the optical image from microfiche passing in conventional fashion across the carrier tray. A grid 10 is placed on top of the glass plate of microfiche carrier tray 11. The grid 10 preferably contains a set of randomly oriented dots since then the correlation function would be a delta function, the correlation being zero except for a lag of (0,0). However, satisfactory results have been obtained with a grid of mutually perpendicular lines, with the grid aligned to the normal XY orientation of the scanner. Evidently, other grids may also be used. A glass plate 12 is placed on top of the grid 10 to keep it perpendicular to the optical axis of the microfiche lens.

The microfiche reader lens 21 provides a projected image of an object, such as a microfiche record, in conventional fashion which is intercepted by a beam splitter 22 which will reflect a portion of the light and transmit the rest. The reflected image from the beam splitter 22 is intercepted by a mirror 23 that transmits visible light but reflects infrared light. The boundary between transmission and reflection is preferably around 7000 Angstroms for the preferred embodiment described here. The transmitted visible light from the mirror 23 is intercepted by a polarizing filter 24 to enhance the contrast of the image. The resultant filtered light is then focused by a lens 25 onto a linear solid state sensor 26, which thus is also disposed to receive light from the object. The linear solid state sensor 26 is thereby focused onto the microfiche image. The reflected infrared light is focused by another lens 27 onto a rectangular solid state (area) sensor 28. The rectangular solid state sensor is focused onto the grid on top of the microfiche carrier. The optical path for the infrared light is folded by one or more mirrors 29 to compress the physical extent of the device.

Figure 3:
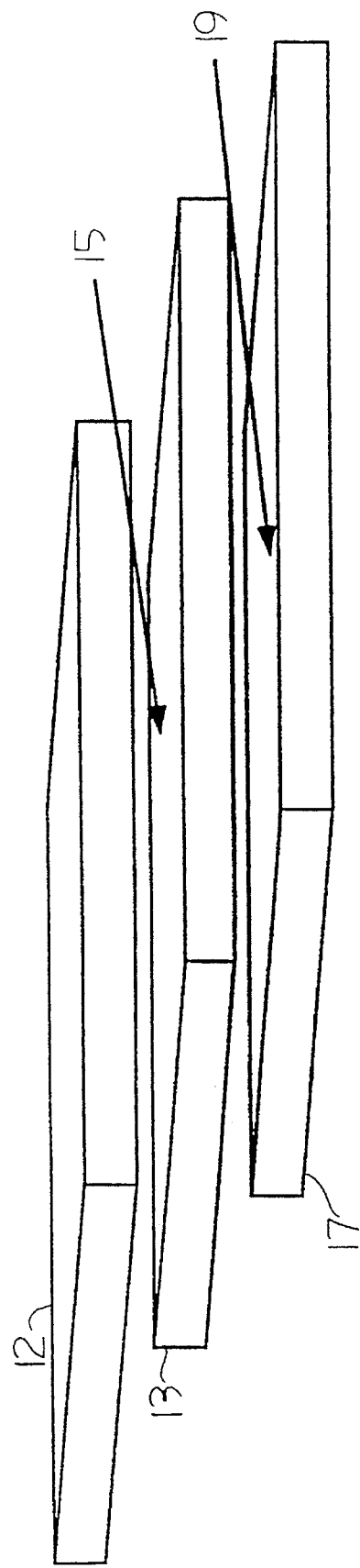
FIG. 3 is a schematic showing the use of a grid with a microfiche in the operation of the present invention.

FIG. 3 shows the placement of the reference grid 10 on top of the top glass plate 13 of the microfiche carrier, as shown by the arrow 15 with the microfiche placed between the top glass plate 13 and bottom glass plate 17 as shown by the arrow 19. The size of the grid features is approximately 1/1200 to 2/1200 of an inch, with transmission factor of around 80%. The grid features are opaque to both the visible and near infrared. The grid is separated from the microfiche by the thickness of a glass plate, and will be completely out of focus in the focal plane of the image to be acquired, and is not noticeable to the operator. Since the 2 dimensional sensor has a separate optical focus, it can be focused onto the grid image, thus ensuring a non-sparse image for motion detection. There are many advantages to having the 2 dimensional sensor sensing only in the infrared, some of which are:

The light intensity that is reflected to the 2 dimensional sensor in the near infrared will not affect the image intensity in the visible. The operator will not miss what is not visible.

The microfiche film is more or less transparent to the near infrared. By reflecting out the infrared, the preferred implementation increase the contrast of the image to the linear sensor sensing the visible spectrum. The 2 dimensional sensor also will see only the grid without the "noise" from the visible image, again enhancing its signal to noise ratio.

With the number of reflecting surfaces, the preferred implementation uses a polarizing filter to materially increase the contrast of the image.

Figure 4:
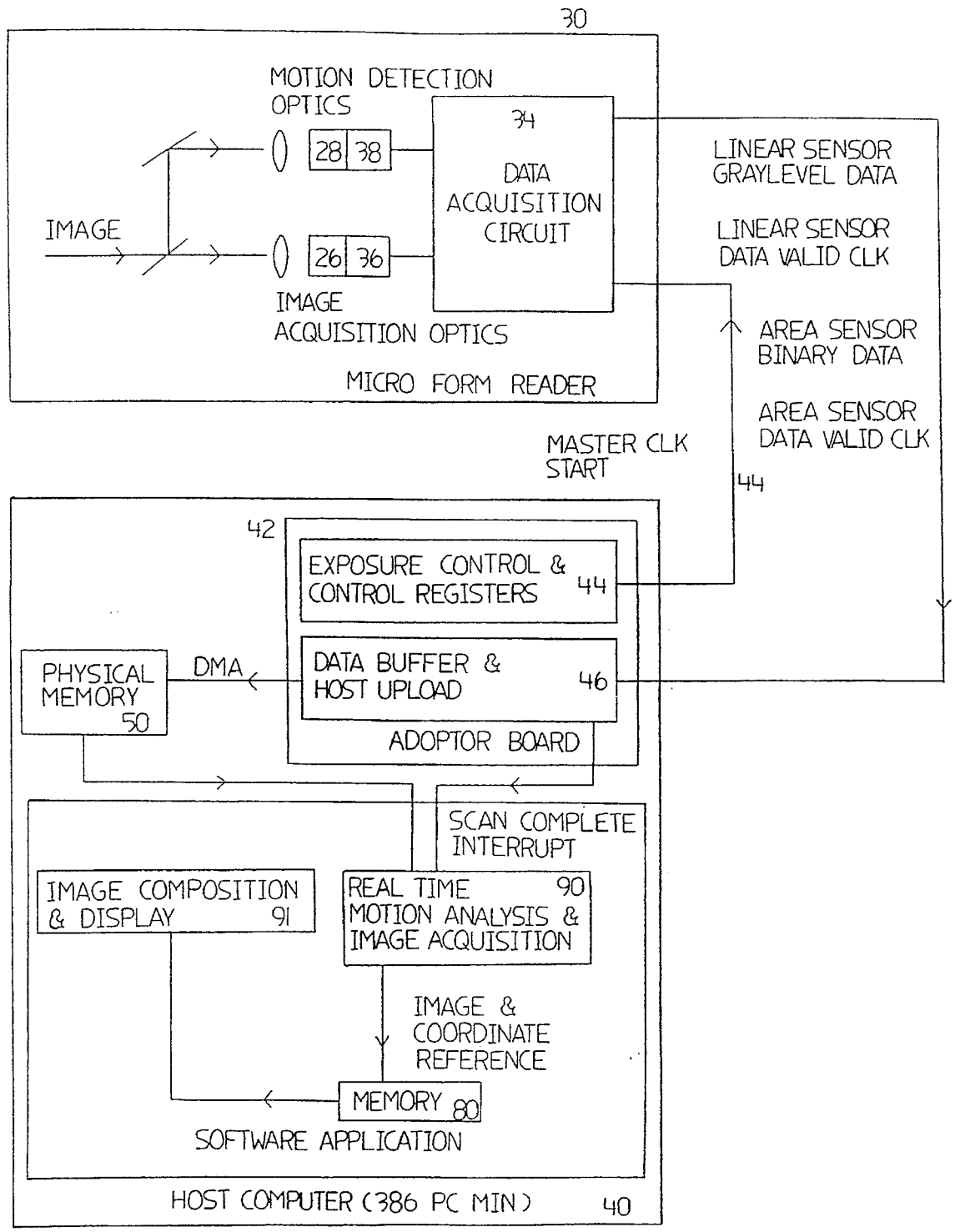
FIG. 4 is a schematic showing the electronic components of one embodiment of the present invention, including remote board and interface board.

The electronic components of the preferred implementation are shown in FIG. 4, with the major components shown in more detail in FIGS. 5, 6 and 7 and described in the following. A remote board 30 is located inside the microfiche reader housing, and is connected by a multiple wire cable 44 to an interface board 42 plugged into an expansion slot on a host computer 40. The computer 40 may be any general purpose PC with a 386 microprocessor or better. The remote board 30 includes sensors 26 and 28, drivers 36 and 38 for the sensors that generate the control signal to read the sensors, and a data acquisition circuit 34 that includes sensor output signal processing circuitry to convert the output signal of the two dimensional sensor 28 to a black and white image and to convert the output of the linear sensor 26 to multiple grey levels and interface circuitry to receive control signals from the interface board and to transmit the resultant digital images to interface board 42 via cable 44. The data acquisition circuit is described in more detail in the discussion of FIG. 6 below.

Figure 5:
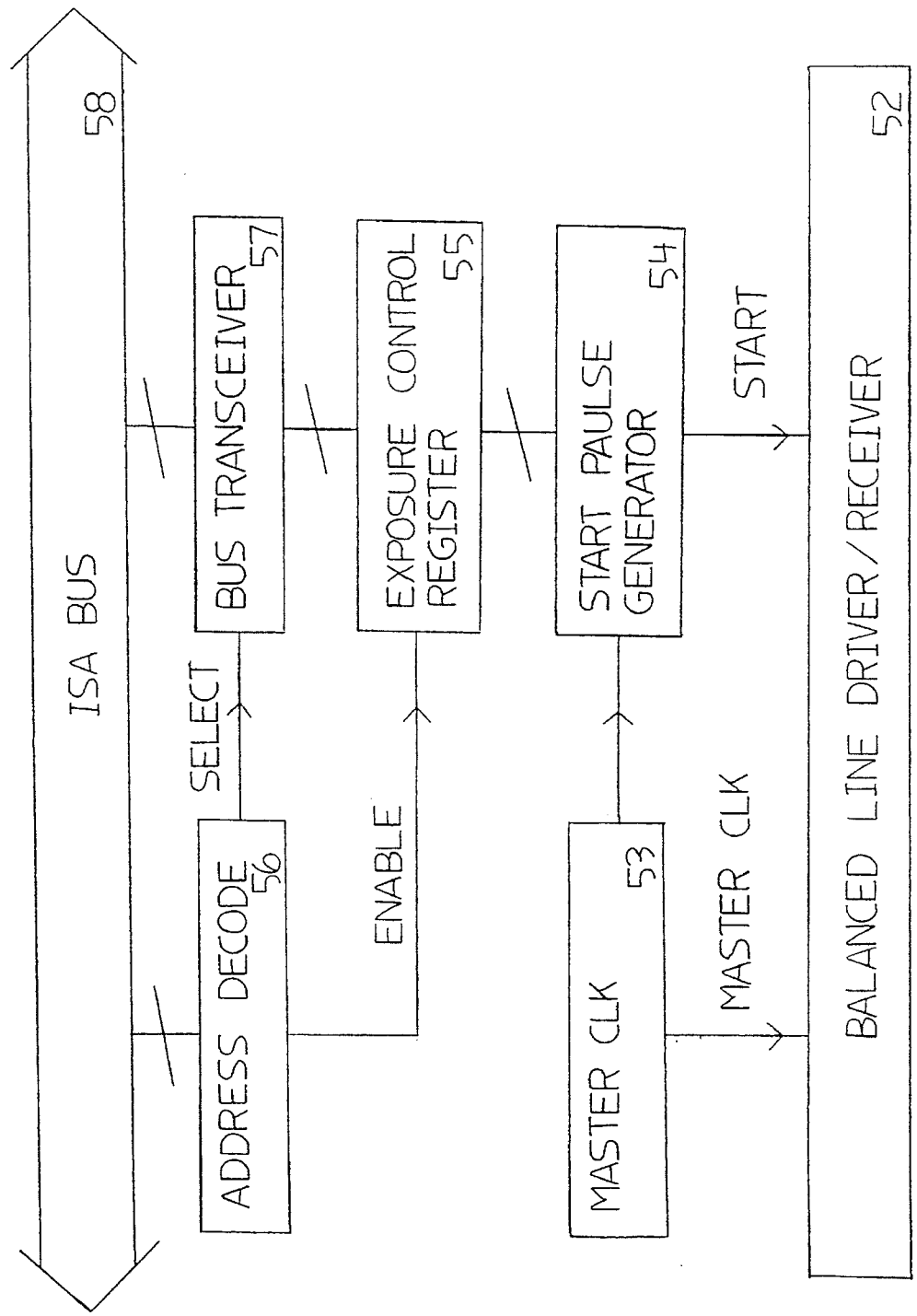
FIG. 5 is a schematic illustrating an exposure control and control register for the opto-electronic components of the invention.

The host computer interface board 42 includes exposure control and control registers 44 as shown in more detail in FIG. 5 to transmit control signals to the remote board 30. The exposure control 44 is connected to the remote board 30 by a conventional balanced line driver 52, for example an EIA-422 driver. A conventional master clock 53 supplies pulses to start pulse generator 54 which is implemented as a counter that counts the number of master clock pulses and generates a start pulse when the count reaches the content of the exposure control register 55. The exposure control register 55 is in turn controlled in conventional fashion by an address decode 56 and bus transceiver 57, each connected to ISA bus 58 on the host computer 40.

Figure 6:
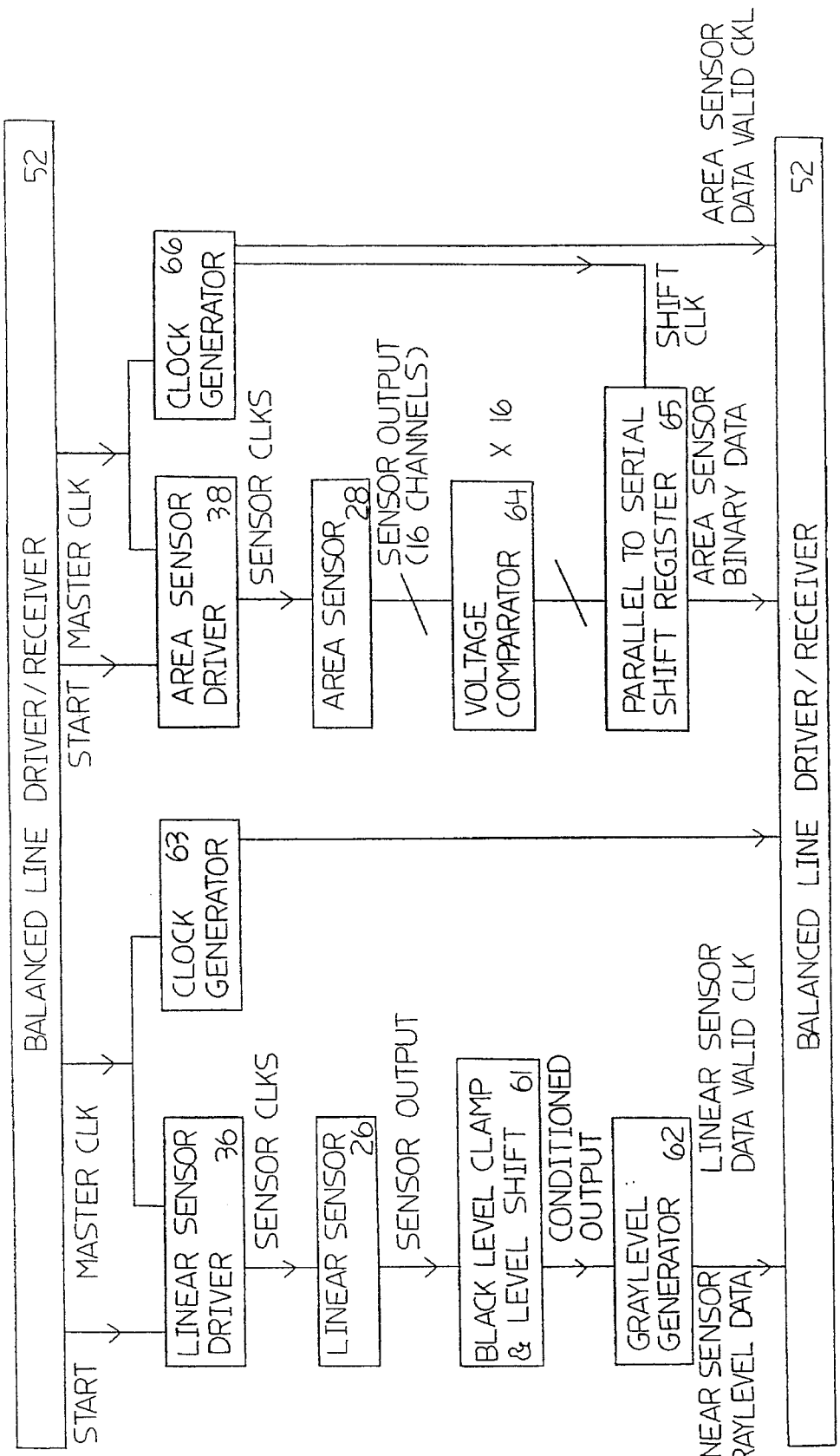
FIG. 6 is a schematic illustrating a data acquisition circuit for obtaining signals from the opto-electronic components of the invention.
Figure 7:
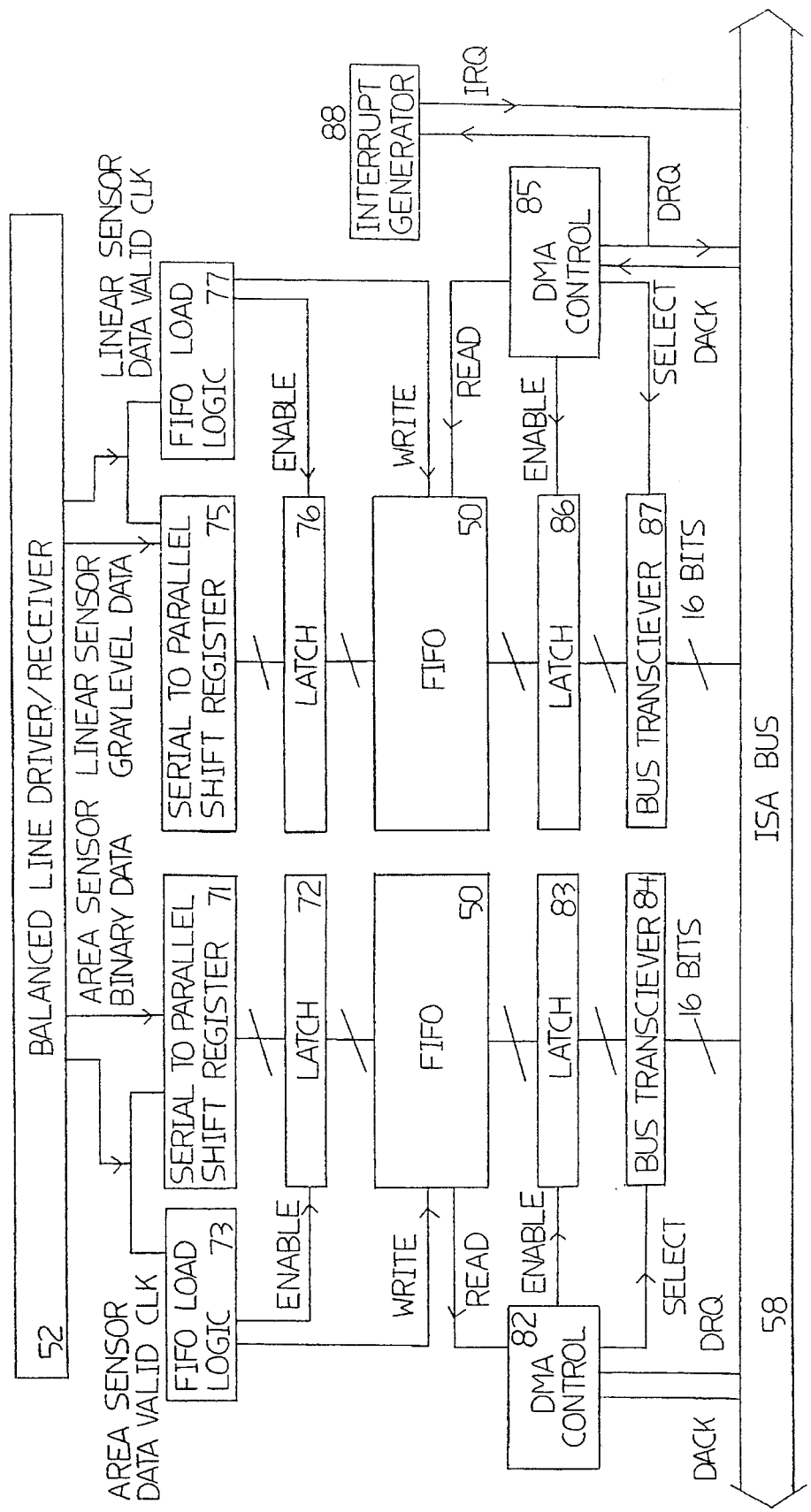
FIG. 7 is a schematic illustrating a data buffer and host upload module for the interface board shown in FIG. 4.

The start pulse generated by the exposure control circuit 44 initiates a scan by the sensors 26 and 28 through the mediation of the data acquisition board 34, shown in more detail in FIG. 6. The start pulse is sent simultaneously from the balanced line driver 52 to the linear sensor driver 36 and to the area sensor driver 38. Both the linear sensor driver 36 and the area sensor driver 38 are conventional drivers that are matched to the sensors used and available from the manufacturers of the sensors. The sensor drivers 36 and 38 generate the necessary clocks to read the signals from the sensors. The output from the linear sensor 26 is fed to a conventional black level clamp and level shift 61 and then to a gray level generator 62 to convert the signal to digitized gray levels. At the same time, the master clock signal from the master clock 53 shown in FIG. 5, is supplied to a clock generator 63 which provides a clock whose timing can be used as a data valid clock for the linear sensor graylevel data. The gray level generator 62 is implemented in the preferred embodiment by a 3 voltage comparator (not shown) whose latched output is fed to a priority encoder, which produces a 2 bit graylevel. The reference voltage for the comparator is produced by potentiometers (not shown). However, the gray level generator 62 may have any of various configurations, well known in the art, and need not be further described. The start signal and master clock signal are also supplied by the balanced line driver 52 to the area sensor driver 38 that controls the area sensor 28 and sends a clock signal to the area sensor 28 to read the sensor. In the preferred implementation, the area sensor 28 has 16 parallel output channels. This 16 parallel output channel is fed to a bank of 16 voltage comparators 64 whose reference voltage is controlled by a potentiometer (not shown) in conventional fashion. The output of the comparator 64 is fed to a parallel to serial shift register 65 which produces area sensor binary data that is sent via the balanced line driver 52 to the interface board 42. As with the linear sensor 26, the master clock signal from the master clock 53 is supplied to a clock generator 66 that provides a shift clock signal to the shift register 65 and a data valid clock for the serial area sensor data.

When the sensors 26 and 28 are read, the signals are sent to the interface board 42. Processing of the signals is shown in FIG. 7. The received linear sensor data is supplied to a conventional serial to parallel shift register 71 along with the data valid clock to build the data into bytes using the data valid clock as the shift clock. The linear sensor data bytes are then supplied to a conventional latch 72 under control of FIFO load logic 73. The data valid clock is also supplied to the FIFO load logic 73 which counts the data valid clock transitions and enables the latch 72 whenever a byte of data has been built, and then writes the latched byte into FIFO memory circuit 50. The FIFO memory 50 is unloaded and uploaded to the memory 80 of the host computer 40 by conventional a direct memory access control 85 using a 16 bit DMA channel. Whenever the DMA channel is free, which is signified by the conventional DACK signal on the ISA bus, the DMA control 86 latches the output of the FIFO memory 50 using latch 87 and loads the data onto the ISA bus using a conventional bus transceiver 84. At the same time, the host computer is signalled by the DMA control 82 with a conventional DRQ signal to request a DMA cycle.

Similar circuitry is used for the area sensor data, this time using serial to parallel shift register 75, FIFO load logic 77, latch 76, FIFO memory 50, DMA control 82, latch 83 and bus transceiver 84. The description of the linear sensor processing applies and need not be repeated.

In addition, an interrupt signal is sent to the ISA bus whenever a complete scan has been accessed, which is determined by counting the DRQ signal with an interrupt generator 88 and supplying a conventional interrupt signal IRQ to the ISA bus.

The area sensor data and linear sensor data are therefore supplied to the ISA bus 58 of the host computer 40, where it is stored for as long as desired in storage means or memory 80. Image analysis and acquisition and subsequent image composition and display is controlled using a software implementation (signified by the blocks 90 and 91 in FIG. 4). The software implementation may be readily understood from the attached software, the discussion of the mathematical implementation of the correlation function and the description that follows.

Image motion is determined as follows:

(1) A signal is generated by the control circuitry 44, and sent to both the 2 dimensional sensor driver 38 and the linear sensor driver 36 to initiate a scan. This ensures that the start of the scan for both sensors 26 and 28 are synchronized.

(2) For each scan, the 2 dimensional sensor driver 38 generates a sequence of control signals required to read analog video signals from the sensor 28. The analog output signal from the sensor 28 is processed by an analog to digital converter that converts the analog signal to a digital signal of logical 1's and 0's. The resultant digital signal is latched and transmitted to the interface board 42. The threshold level between the digital 1 and 0 is controlled by a conventional potentiometer (not shown).

(3) Similarly, for each scan, the linear sensor driver 36 generates a sequence of control signals required to read the video signals from the linear sensor 26. The analog output signal is processed by circuitry into digital grey levels. The threshold level for each grey level is controlled by conventional potentiometers (not shown). The digital signals are again latched and sent to the interface board 42.

(4) The digital signals from both the 2 dimensional and linear sensors 28 and 26 are stored into memory 50 located on the interface board 42. The digital signal stored in the memory is read and sent to the host computer 40. The preferred implementation uses DMA transfer into an IBM/AT* or compatible computer for processing, although for one knowledgable in the arts, other methods of data transfer are readily implemented. * is a trademark of IBM.

(5) When the digital data for a scan from both sensors 28 and 26 has been transferred into the computer, the computer is notified via an interrupt (IRQ).

(6) On notification that a complete scan corresponding to the acquisition of an image has been transferred to its memory, the computer processes the data as follows.

(a) The computer discards the first scan, since the sensors 28 and 26 are probably over exposed due to the length of time since the previous scan.

(b) The computer stores the 2nd scan as the initial "REFERENCE IMAGE". A "IMAGE COORDINATE" is assigned an initial value of (0,0). The "REFERENCE IMAGE", "IMAGE COORDINATE" and associated linear scan is stored for subsequent use in the memory 80 as the 1st line of the acquired image. Associated with each "REFERENCE IMAGE" is the threshold distance to the next unit of resolution (pixel). There will be 4 threshold distances as follows (i) $T_{+x}$, $T_{-x}$—threshold distance to the next pixel in the plus and negative X direction.

(ii) $T_{+y}$, $T_{-y}$—threshold distance to the next pixel in the plus and negative Y direction.

In general, the "IMAGE COORDINATE" will not be in whole pixels, therefore, the threshold distance in the plus and negative direction will differ.

(c) From the 3rd scan onward, the computer carries out the following processing of the successive images of the microfiche record:

(i) The 3rd scan is acquired and stored as the current image. The correlation matrix of the current image from the 2 dimensional sensor and the "REFERENCE IMAGE" is calculated using the attached software implementation of the correlation function described in Equation 1. The preferred implementation uses a 5×5 matrix, although this can be readily changed to a matrix of arbitrary size. The range of horizontal lag value is (−2,2) and that of the vertical lag value is (−2,2) in the preferred embodiment.

(ii) The correlation matrix is searched to locate the element with the maximum value. A 3×3 submatrix of the correlation matrix is defined with the maximum element at the centre. The Discrete Fourier Transform of this 3×3 submatrix is calculated.

(iii) The Discrete Fourier Transform of the correlation submatrix (ii above) is used to calculate the phase spectrum as described in Equation (2).

(iv) The motion vector ($\delta x, \delta y$), of the current image with respect to the "REFERENCE IMAGE" is calculated as described in Equation 5 and 6.

(v) The motion vector ($\delta x, \delta y$) is compared with the threshold distance ($T_{+x}$, $T_{-x}$, $T_{+y}$, $T_{-y}$) to check if the image has moved 1 pixel or more with respect to the "REFERENCE IMAGE".

(vi) If the image has not moved a pixel or more in either direction, the current image is discarded. Otherwise, the image having moved 1 or more pixels with respect to the "REFERENCE IMAGE", the SELECTED IMAGE, which is from the 2 dimensional sensor and corresponds to the saved linear image, is used as the new "REFERENCE IMAGE". The new "REFERENCE IMAGE", "IMAGE COORDINATE" and associated linear image is saved in the memory of the computer. The motion vector is added to the "IMAGE COORDINATE" to get a new "IMAGE COORDINATE". A new set of threshold distances ($T_{+x}$, $T_{-x}$, $T_{+y}$, $T_{-y}$) is calculated.

The device will continue to acquire and save successive "REFERENCE IMAGE", "IMAGE COORDINATE" and associated linear image in this manner by repeating steps (i), (ii), (iii), (iv), (v) and (vi), all of which is under the control of the attached software represented by block 90 of FIG. 4. The linear image is acquired from the linear sensor 26, the "REFERENCE IMAGE" is acquired from the 2 dimensional sensor and stored along with their associated "IMAGE COORDINATE" in the memory 80 of the computer until image acquisition is complete.

The acquired image is reconstructed from the saved linear images and associated "IMAGE COORDINATE" using the attached software represented by block 91 in FIG. 4. The reconstructed image will be a mosaic of linear images with the first pixel of the linear image located at the pixel coordinate given by the associated "IMAGE COORDINATE".

Alternatively, a more accurate motion vector corresponding to each save image can be recalculated from the saved "REFERENCE IMAGE". This can be accomplished by using a larger correlation matrix, calculating the Discrete Fourier Transform for a larger submatrix, etc. In this manner, a more accurate set of "IMAGE COORDINATE" can be generated to be used to reconstruct the image.

An alternative, but not preferred, manner of saving images and determining image movement is as follows (the * suffix on the step number indicates that the step is alternative and not preferred):

(b*) The computer stores the 2nd scan as the initial "REFERENCE IMAGE". Associated with each "REFERENCE IMAGE", the computer calculates an auto-correlation value for a lag of (0,1), horizontal lag of 0 and vertical lag of 1. This $\phi_{lag\ 1}(0,1)$ value is used to determine the threshold of when the image has moved a pixel. The corresponding linear scan is stored for subsequent use in the memory 80 as the 1st line of the acquired image. This linear image will be tagged with an initial "IMAGE COORDINATE" of (0,0).

(c*) From the 3rd scan onward, the computer carries out the following processing of the successive images of the microfiche record:

(i*) The 3rd scan is acquired and stored as the current image. The correlation matrix of the current image from the 2 dimensional sensor and the "REFERENCE IMAGE" is calculated using the attached software implementation of the correlation function described above in Equation 1. The preferred implementation uses a 5×5 matrix, although this can be readily changed to a matrix of arbitrary size, but increasing the size increases the computation effort without a corresponding increase in performance of the process. The range of the horizontal lag value is (−2, 2) and that of the vertical lag value is (−2, 2) in the preferred embodiment.

(ii*) The $\phi(0,0)$ element of the correlation matrix of the subject image with the reference image determined from equation 1 is compared with the $\phi_{lag\ 1}(0,1)$ value of the "REFERENCE IMAGE". If the value of $\phi(0,0)$ is too much larger than the $\phi_{lag\ 1}(0,1)$ value within definable limits (about 10%), the image has not moved a pixel with respect to the "REFERENCE IMAGE", and the image data from this scan is discarded. If the value of $\phi(0,0)$ is less than or equal to $\phi_{lag\ 1}(0,1)$ value, the image has moved 1 pixel or more with respect to the "REFERENCE IMAGE".

It might be acceptable in some cases if the linear image corresponding to this subject image were now stored and tagged with its associated image motion vector. The image motion vector is the (x,y) coordinate corresponding to the maximum value of $\{\phi(x,y)$ for $-2 \le x \le 2$ and $-2 \le y \le 2\}$. However, if a subject image with $\phi(0,0) \le \phi_{lag\ 1}(0,1)$ is always chosen, a systematic bias may creep into the digitized final product in which the resulting image is stretched. This is because choosing $\phi(0,0) \le \phi_{lag\ 1}(0,1)$ guarantees that the image has moved at least a pixel, but in the general case this will be slightly more than a pixel, while the image motion vector tag is in pixel increments. Thus, it is preferable that some subject images where $\phi(0,0) > \phi_{lag\ 1}(0,1)$ be selected as the image whose corresponding linear image will be saved. The preferred way of accomplishing this is to save images temporarily for which $\phi(0,0) > \phi_{lag\ 1}(0,1)$ (but not more than 10% larger) as CANDIDATE IMAGES and not to discard them immediately, and if the value of $\phi(0,0)$ of the next subject image is not closer than the $\phi(0,0)$ of the CANDIDATE IMAGE to $\phi_{lag\ 1}(0,1)$ then to save the linear image corresponding to the CANDIDATE IMAGE, but otherwise to save the linear image corresponding to the subject image. In this manner, at least some images will be saved for which $\phi(0,0) > \phi_{lag\ 1}(0,1)$, yet without saving images for which no motion occurred.

(iii*) The SELECTED IMAGE, which is from the 2 dimensional sensor and corresponds to the saved linear image, is used as the new "REFERENCE IMAGE" and a new "LAG (0,1)" calculated. The corresponding image from the linear sensor is saved in the memory of the computer. An "IMAGE COORDINATE" is assigned to the saved image that is equal to the matrix coordinate of the peak correlation value.

The device will continue to acquire and save successive images in this manner by repeating steps (i*), (ii*) and (iii*), all of which is under the control of the attached software represented by block 90 of FIG. 4. The images are acquired from the linear sensor 26 and stored along with their associated image motion vectors in the memory 80 of the computer until stopped by the operator.

The acquired image is reconstructed from the saved linear images and associated image motion vector using the attached software represented by block 91 in FIG. 4. The reconstructed image will be a mosaic of linear images with the first pixel of the linear image located at the pixel coordinate given by it image motion vector.

The optical components used in the invention are conventional and may be obtained from Melles Griot Canada of Nepean, Ontario, for example. An example of a suitable two dimensional sensor 28 is model #RA1662N from EG&G Recticon of Sunnyvale, Calif. An example of a suitable linear sensor 26 is model #RL2048D of EG&G Recticon or Texas Instruments' TC103-1.

The method and apparatus of the invention also have application outside of pure image acquisition techniques. For example, the invention can be used to detect the motion and velocity of bubbles in a fluid. In such a case, it is not necessary that an image be permanently stored. It may be enough that the degree of motion (motion vector) is calculated, and the distance moved divided by the sampling interval between sampling of the current and reference images to obtain the velocity of the object. Of course, if desired, the images may also be permanently acquired using the invention.

ALTERNATIVE EMBODIMENTS

A person skilled in the art could make immaterial modifications to the invention described and claimed in this patent without departing from the essence of the invention.

The embodiments of the invention in which an exclusive property or privilege is claimed are defined as follows:

1. Apparatus for capturing images of a record of micro-images, the record of micro-images including non-sparse images, the apparatus comprising:

image acquisition means for repeatedly acquiring and at least temporarily storing successive non-sparse images from the record of micro-images;

the image acquisition means including an area sensor disposed to receive light from the non-sparse images;

and the apparatus further including a second sensor disposed to receive light from the record of micro-images, the second sensor being operatively connected to the storage means for supplying images to the storage means;

correlation means for correlating successive non-sparse images from the record of micro-images to create a correlation matrix and determine if motion of the record of micro-images has occurred between successive images of the record of micro-images;

the correlation means including means to:
   (i) calculate the Fourier transform of the correlation matrix to produce a phase spectrum, the Fourier transform defining a frequency space having axes and the phase spectrum defining a plane in the frequency space; and
   (ii) calculate the degree of movement of the current image from the reference image using the projection of the plane onto the axes of the frequency space; and storage means for permanently storing an image of the record of micro-images when motion has occurred between successive images.

2. The apparatus of claim 1 in which the non-sparse image is created by a reference grid superimposed on the record of micro-images in which the grid is sufficiently dense that elements of the grid appear in every areal subset of the record of micro-images from which the reference and current digital signals are obtained.

3. The apparatus of claim 1 in which:
   the second sensor is a linear sensor.

4. The apparatus of claim 1 in which:
   the second sensor is a linear sensor;
   the area sensor operates at wavelengths outside of the visible light range;
   the reference grid is formed from a material that is opaque at the wavelengths at which the area sensor operates; and
   the reference grid is not visible to the linear sensor.

5. The apparatus of claim 4 in which the reference grid is out of the focal plane of the linear sensor.

6. A method of controlling a device using an area sensor to detect motion of an object, the method comprising the steps of:

repeatedly acquiring and at least temporarily storing successive electronic images of at least a non-sparse part of the object, the successive electronic images including at least a reference electronic image and a current electronic image;

correlating the reference electronic image with the current electronic image in a computing device to determine if motion has occurred between them including the steps of:
   (a) correlating the electronic reference image with the current electronic image to yield a correlation matrix;
   (b) calculating the Fourier transform of the correlation matrix to produce a phase spectrum, the Fourier transform defining a frequency space having axes and the phase spectrum defining a plane in the frequency space; and
   (c) calculating the degree of movement of the current electronic image from the reference electronic image using the projection of the plane onto the axes of the frequency space;

producing control signals upon calculating the degree of movement of the current electronic image from the reference electronic image; and providing the control signals to a controller to control operation of the device using the control signals.

7. The method of claim 6 in which the device has a field of view and the object is in the field of view of the device.

8. The method of claim 6 further including storing a signal representing the degree of movement of the object.

9. The method of claim 6 further including:
   permanently storing an electronic image of the object when motion of the object has occurred.

10. The method of claim 9 further including calculating the velocity of the object by dividing the degree of movement by the sampling interval between the current electronic image and the reference electronic image.

11. The method of claim 9 in which:
    the successive electronic images are acquired using an area sensor and the electronic image that is permanently stored is acquired using a second sensor.

12. The method of claim 11 in which the second sensor is a linear sensor.

13. Apparatus for controlling a device using an area sensor to detect motion of an object, the apparatus comprising:

an area sensor for repeatedly acquiring and at least temporarily storing successive electronic images of at least a non-sparse part of the object, the successive electronic images including at least a reference electronic image and a current electronic image;

computing means connected to receive signals from the area sensor for correlating the reference electronic image with the current electronic image to determine if motion has occurred between the reference electronic image and the current electronic image including:
    (a) means for correlating the electronic reference image with the current electronic image to yield a correlation matrix;
    (b) means for calculating the Fourier transform of the correlation matrix to produce a phase spectrum, the Fourier transform defining a frequency space having axes and the phase spectrum defining a plane in the frequency space; and
    (c) means for calculating the degree of movement of the current electronic image from the reference electronic image using the projection of the plane onto the axes of the frequency space;

an interface for producing control signals upon calculating the degree of movement of the current electronic image from the reference electronic image; and a controller operatively connected to the interface and the device to control operation of the device using the control signals.

14. The apparatus of claim 13 in which the device has a field of view and the object is in the field of view of the device.

15. The apparatus of claim 14 in which the device is a linear sensor.

16. The apparatus of claim 15 further including:

a memory for permanently storing an electronic image of the object produced by the linear sensor when motion of the object has occurred.

17. The apparatus of claim 16 in which the object is a record of micro-images.

18. The apparatus of claim 17 further including a non-sparse device immobilized in relation to the record of micro-images.

19. The apparatus of claim 13 further including a memory containing a signal representing the degree of motion of the object.

20. A method of controlling a device using an area sensor to detect motion of an object, the method comprising the steps of:

repeatedly acquiring with an area sensor and at least temporarily storing successive electronic images of only a non-sparse areal subset of the object, the successive electronic images including at least a reference electronic image and a current electronic image;

determining when movement has occurred between successive images of the object by correlation of the reference electronic image with the current electronic image and producing a control signal when movement has occurred;

correlation of the reference electronic image and the current electronic image including:

(a) correlating the electronic reference image with the current electronic image to yield a correlation matrix;

(b) calculating the Fourier transform of the correlation matrix to produce a phase spectrum, the Fourier transform defining a frequency space having axes and the phase spectrum defining a plane in the frequency space; and (c) calculating the degree of movement of the current electronic image from the reference electronic image using the projection of the plane onto the axes of the frequency space; and providing the control signals to a controller to control operation of the device using the control signals.

21. A method of controlling a device using an area sensor to detect motion of an object, the device having a field of view and the object being in the field of view of the device, the method comprising the steps of:

repeatedly acquiring with an area sensor and at least temporarily storing successive electronic images of only a non-sparse areal subset of the object, the successive electronic images including at least a reference electronic image and a current electronic image;

determining when movement has occurred between successive images of the object by correlation of the reference electronic image with the current electronic image and producing a control signal when movement has occurred;

providing the control signals to a controller to control operation of the device using the control signals; and permanently storing an electronic image of the object by acquiring the electronic image using a second sensor when motion of the object has occurred.

22. The method of claim 21 in which the second sensor is a linear sensor.

23. The method of claim 21 in which the object is a record of micro-images and further including moving the object through the field of view of the area sensor and the second sensor.

24. The method of claim 23 in which the area sensor is focused on a grid superimposed on the record of micro-images in which the grid is sufficiently dense that elements of the grid appear in every areal subset of the record of micro-images from which the reference and current electronic signals are obtained.

25. The method of claim 24 further including reconstructing the record of micro-images from the images acquired with the second sensor and the degree of motion of the record of micro-images.

26. The method of claim 23 in which the second sensor is a linear sensor.

27. Apparatus for controlling a first sensor using an area sensor to detect motion of an object, the first sensor having a field of view and the object being observable in the field of view of the first sensor, the apparatus comprising:

an area sensor for repeatedly acquiring and at least temporarily storing successive electronic images of only a non-sparse areal subset of the object, the successive electronic images including at least a reference electronic image and a current electronic image;

a computer connected to receive electronic images from the area sensor for determining when movement has occurred between successive images of the object by correlation of the reference electronic image with the current electronic image;

an interface operatively connected to the computer for producing control signals when movement has occurred between successive images; and a controller operatively connected to the interface and the first sensor to control operation of the first sensor using the control signals.

28. The apparatus of claim 27 further including:

a memory for permanently storing an electronic image of the object produced by the second sensor when motion of the object has occurred.

29. The apparatus of claim 28 in which the object is a record of micro-images.

30. The apparatus of claim 29 in which the second sensor is a linear sensor.

31. The apparatus of claim 29 in which the area sensor is focused on a grid superimposed on the record of micro-images in which the grid is sufficiently dense that elements of the grid appear in every areal subset of the record of micro-images from which the reference and current electronic images are obtained.

32. The apparatus of claim 29 in which:

the second sensor is a linear sensor;

the area sensor operates at wavelengths outside of the visible light range;

the reference grid is formed from a material that is opaque at the wavelengths at which the area sensor operates; and the reference grid is not visible to the linear sensor.

33. The apparatus of claim 32 in which the reference grid is out of the focal plane of the linear sensor.

34. The apparatus of claim 29 further including a non-sparse device immobilized in relation to the record of micro-images, the area sensor is focused on the non-sparse device and the second sensor is a linear sensor is focused on the object.

35. The apparatus of claim 27 further including a memory containing a signal representing the degree of motion of the object.

* * * * *